United States Patent [19]

Monleone

[11] Patent Number: 5,874,821
[45] Date of Patent: Feb. 23, 1999

[54] METHOD AND APPARATUS FOR CONTROLLING A BRUSHLESS ELECTRO MOTOR BY DETERMINING THE ABSOLUTE PHASE POSITION OF THE ROTOR RELATIVE TO THE STATOR

[76] Inventor: Riccardo Monleone, Via la Santa 29, CH-6962 Viganello, Switzerland

[21] Appl. No.: 958,886

[22] Filed: Oct. 27, 1997

Related U.S. Application Data

[63] Continuation of Ser. No. 539,681, Oct. 5, 1995, abandoned.

[30] Foreign Application Priority Data

Oct. 21, 1994 [DE] Germany ........................ 44 37 793.2

[51] Int. Cl.[6] .................................................. G05B 19/29
[52] U.S. Cl. ......................... 318/600; 318/592; 318/652
[58] Field of Search .................................. 318/560–566, 318/568.17, 569–579, 590–596, 599–605, 640, 652–661, 439, 138, 254

[56] References Cited

U.S. PATENT DOCUMENTS

| | | | |
|---|---|---|---|
| 4,455,513 | 6/1984 | Fulton et al. ........................... | 318/138 |
| 4,888,543 | 12/1989 | Bleijenberg ............................. | 318/721 |
| 5,003,238 | 3/1991 | Lum et al. .............................. | 318/592 |
| 5,092,051 | 3/1992 | Holmer et al. ........................... | 33/1 N |
| 5,196,775 | 3/1993 | Harris et al. ............................ | 318/638 |
| 5,204,603 | 4/1993 | Taylor et al. ........................... | 318/657 |
| 5,254,914 | 10/1993 | Dunfield et al. ........................ | 318/254 |
| 5,254,919 | 10/1993 | Bridges et al. ......................... | 318/560 |
| 5,332,955 | 7/1994 | Hopper .................................... | 318/632 |
| 5,343,127 | 8/1994 | Maiocchi ................................. | 318/254 |
| 5,461,293 | 10/1995 | Rozman et al. ......................... | 318/603 |
| 5,530,326 | 6/1996 | Galvin et al. ........................... | 318/254 |
| 5,530,331 | 6/1996 | Hanei ...................................... | 318/592 |
| 5,537,020 | 7/1996 | Couture et al. ......................... | 318/720 |
| 5,569,990 | 10/1996 | Dunfield ................................. | 318/254 |

*Primary Examiner*—Brian Sircus
*Attorney, Agent, or Firm*—Darby & Darby

[57] ABSTRACT

The invention relates to a method for controlling an electric motor, in particular of a brushless electric motor, whereby the absolute phase position of a rotor in relation to a stator of the electric motor (4) is determined, and to an apparatus for the method. A characteristic feature of the invention is that one or several movement(s) of the rotor are excited, the absolute phase position of the rotor in relation to the stator is measured, and the absolute phase position is deduced therefrom.

24 Claims, 4 Drawing Sheets

METHOD AND APPARATUS FOR CONTROLLING A BRUSHLESS ELECTRO MOTOR BY DETERMINING THE ABSOLUTE PHASE POSITION OF THE ROTOR RELATIVE TO THE STATOR

This is a continuation, of application Ser. No. 08/539,681, filed Oct. 5, 1995 now abandoned.

BACKGROUND OF THE INVENTION

1. Field of the Invention

This invention relates to the control of an electric motor, in particular of a brushless electric motor, whereby the absolute phase position of a rotor in relation to a stator of the electric motor is determined.

In the following, the terms "Rotor" and "Stator" shall apply only to the functional description of the basic elements of an electric motor, which either change their position with respect to an external coordinate system (rotate or move)—the rotor—, or are fixed with respect to an external coordinate system—the stator.

During the start-up of the electric motor, it is desirable to know the exact angular position or phase position of the rotor in relation to the respective stator, in order to be able to generate a suitable torque on the rotor. In known methods or apparatus, this information is obtained by measuring an absolute position. For this purpose, for example, an absolute measuring system is attached to the shaft of the rotor, to which the rotor is attached. The absolute measuring system indicates any given moment the exact angular position of the rotor in relation to the stator.

2. Description of the Related Art

Often, so called resolvers or Hall sensors are employed as absolute measuring systems. The resolvers are, for instance, induction sensors or rotatable transformers. The Hall sensor usually consists of three sensors which are arranged on the shaft and offset with respect to each other by 120°. Such absolute measuring systems are arranged on the electric motor in such fashion that they are able to indicate the absolute phase position of the rotor in relation to the stator under all operating condition—even when the controls for the electric motor are switched off. Their control and operation, however, requires sophisticated and therefore expensive electronic circuits.

In a known control process particularly for synchronous motors having brushes and brushholders, respectively, the absolute phase position is determined from the phase position of the sinusoidal voltage induced at the brushholders. The disadvantage of this process, however, is that it is only functional when the rotor rotates, i.e. when the electric motor is operating. Often, however,—e.g. when electric power is switched on—electric motors must not move at all or move only slightly. It is, for instance, particularly important for an apparatus for the electroerosive processing of work pieces where electric motors control the movement of work table and/or the guide the electrodes, that the exact phase position of the rotor in relation to the stator is known when the electric motor is turned on, and, on the other hand, uncontrolled rotation of the rotor during the start-up is prevented, if at all possible. These requirements become especially obvious in view of the high precision required during the operation of such apparatus. When the electric motors, for instance, control the guide heads for the electrodes and the cutting wire, respectively, even unintentional movements in the range of micrometers can have a significant adverse effect on the processing of the work pieces. Uncontrolled movements of the electric motor can even damage the mechanical device (guide head) or the work pieces to be processed.

SUMMARY OF THE INVENTION

It is the object of this invention to establish a method and an apparatus for controlling electric motors, in particular brushless electric motors, which simplify the determination of the absolute phase position.

The invention accomplishes this through a method for controlling an electric motor, particularly a brushless electric motor, wherein the absolute phase position of a rotor in relation to a stator of the electric motor is determined, in that one or several movement(s) of the rotor are excited; the respective actual phase position change ($\Delta\Phi_N$) of the rotor in relation to the stator is measured; and the absolute phase position ($\Phi_1$) is derived; and further by a method which includes parameters internal to the process which are optimized by a fuzzy controller. Hereby, the absolute phase position of a rotor in relation to a stator in an electric motor is determined by exciting one or several movements of the rotor, by measuring the corresponding actual phase position or change in angular position of the rotor in relation to the stator, and therefrom deducing the absolute phase position. In the following, the magnitude of the excited movements is selected to be small enough so that the aforementioned problems—too large unintentional movements of the rotor in the start-up phase—do not occur. However, the magnitude of the movements to be excited can preferably also be selected without taking possible unintentional movements of the rotor into consideration.

An apparatus for the aforementioned method comprises exciting means for exciting a movement of the rotor in relation to the stator, measuring means for measuring the actual change in phase position of the rotor in relation to the stator, and interpreting means for deducing the absolute phase position of the rotor in relation to the stator.

One advantage of the invention is that a measuring system already in existence can be utilized to measure the changes in the phase position of the rotor in relation to the stator and thus the entire structure can be simplified and produced less expensively due to the reduction in the parts count. This measuring system is employed predominantly in brushless electric motors where it is used for control functions. The invention has the further advantage that in the preferred embodiment neither information about the actually applied current nor information about the actually induced voltage, e.g. at the terminals of an electric motor, is required to determine the absolute phase position.

Since some time now, brushless electric motors are used more and more, since they are appreciated for their compact size, their reliability, their simple construction, and their excellent dynamic properties.

One has to distinguish between two different kinds of brushless electric motors, depending on the wave form of the excitation current or the induced voltage. The excitation current can, for instance, have a trapezoidal or a sinusoidal form.

The electric circuitry of brushless electric motors which are excited with a trapezoidal excitation current, is less expensive than the circuitry for brushless electric motors which are excited with a sinusoidal excitation current, since the electric 360° period can be, in a coarse approximation, divided into six segments—six "sextants". Within each sextants, the voltage or the current are only applied to and controlled between two of the three terminals. Within a sextant, the brushless electric motor corresponds to an ordinary DC motor when a trapezoidal excitation current is applied, since the applied current in this sector is essentially constant.

In a brushless electric motor which is excited by a sinusoidal excitation current, all three phases are active when a three-phase current is applied, and this brushless electric motor therefore corresponds in principle to a (synchronous) AC motor with a permanent magnet rotor.

The aforementioned measuring system in the electric motor, specifically in the brushless electric motor, basically records only a change in the angle (or a change in length for linear motors). The measured values for the change in angle or length are then transmitted to control means connected to the electric motor. These values are used by the control means to deduce reactions of the electric motor to an earlier voltage or current applied by the control means. The control takes this reaction into account when the next voltage or current pulse (or vector) is selected and hereby prevent an uncontrolled break-out or a so-called slip of the motion of the rotor during operation.

According to the invention, this aforementioned measuring system is further utilized for determining also the absolute phase position, using sophisticated evaluation means and excitation means—e.g., after the power is switched on.

Known resolvers which are often employed to determine the absolute phase position in brushless electric motors with an applied sinusoidal excitation current, can in principle also assume these functions—namely the deduction of a change in the phase position from absolute measurements—; compared to the aforementioned measurement means which are designed to measure only a change in the phase position, these resolvers, however, have a great disadvantage. The aforementioned resolvers can often resolve only several arc minutes. In addition, the additional electronic processing of the resolver signal requires extremely expensive electronic equipment, and usually yields a poor signal-to-noise ratio and, simultaneously, a poor rendition of the velocity information at low rotor speed. Therefore, resolvers are usually not suitable for the measurements of the rotor speed of an electric motor which are required for this application.

In the following, only preferred embodiments utilizing a brushless electric motor will be described, instead of electric motors in general. This should, however, not be viewed as a limitation, but serves only for presenting a unified terminology.

In a preferred embodiment, the electric motor is excited by a position and speed control. In the corresponding apparatus, exciting means comprise a position and speed control. Hereby, the apparatus invention for determining the absolute phase position includes the known position and speed control and refers to the same excitation means. Consequently, the expense for circuitry required for implementing the preferred embodiment is greatly reduced. The process according to the invention runs basically in parallel to the position and speed control means of the brushless electric motor which is already in existence.

The electric motor according to the invention is preferably excited with a trapezoidal or sinusoidal current. The electric motor according to the invention can preferably be a brushless electric motor where the magnetic field of the rotor is generated by a permanent magnet, or a synchronous AC motor where the magnetic field of the rotor is generated by an electromagnet. In the case of a sinusoidal excitation, it is important to know the exact position of the rotor in relation to the stator, since the desired torque to the rotor in the desired direction can only be generated, if the phase angle of the applied current has a given relationship to the phase position of the magnetic field of the rotor, for instance, advanced by 90°. This problem exists also in the case of a trapezoidal excitation; however, in this case it is sufficient to know in which of the six sextants the rotor is positioned. For brushless electric motors with applied trapezoidal excitation current, a very coarse method for determining the phase position is already sufficient for gaining complete control over the electric motor.

In the following, only embodiments which comprise a brushless electric motor with an applied sinusoidal excitation current, will be discussed in detail with respect to the apparatus (or the method) of the invention for determining the absolute phase position. These embodiments already contain, as a simplification, the other embodiments comprising a brushless electric motor with an applied trapezoidal excitation current.

In another preferred embodiment the change in the phase position is measured using an incremental optical measuring system. Optical measuring systems are usually renowned for their exceptionally high resolution. If the optical measuring system incorporates, for instance, a laser, then a resolution of 100,000 angular positions during a complete revolution of the rotor is possible.

In another especially preferred embodiment, the phase position is determined using a coarse and a fine measurement process, whereby, during the coarse process, the rotor is retained in a preset phase position range, preferably at a specified value of the phase position (if possible, even if the electric motor is loaded with a static load, e.g. on the z-axis), and the exact absolute phase position is determined during the fine measurement process. Splitting the process for determining the phase position into two separate processes has the advantage that during the beginning phase of the measurement process, an acceptable approximation for the rotor position can quickly be obtained from the initial incremental phase position information of the measuring system. Rotor movement is avoided as much as possible and the approximation for the rotor position can be refined subsequently. The coarse process provides preferably the approximate value for the absolute phase position during the start phase, this information is already sufficient to move or steer the brushless electric motor in the desired direction. This process provides preferably also a safety mechanism which maintains the brushless electric motor in a stable position countering the dynamic effects of the motor loads. The entire process for determining the phase position is functioning equally in applications where a static load acts on the brushless electric motor—e.g. with motors utilized to move vertical axes in a machine tool—, and in applications without such loads. The absolute phase position determined by the coarse measurement process has usually an error of less or equal to 90°. Even in unfavorable situations, this error can result in insufficient available torque, i.e. the dynamic properties of the electric motor are insufficient. These deficiencies can be eliminated by the fine measurement process. This process refines, during subsequent iteration steps, the approximated value of the absolute phase position. This fine measurement process alone, however, is still insufficient for maintaining control over the brushless electric motor. This is especially true for the first iteration steps, where the absolute phase position has not yet been adequately chosen or established. The two measurement processes work preferably in parallel with the known electric motor controls. The absolute phase position during the fine measurement process is preferably determined by a binary search process. This search process starts with an approximate value for the desired phase angle, and all subsequent values of the phase angles which are to be applied later, are determined by bisecting the following value with respect to the previous value. Subsequently, the change in phase position is measured and the measured value forms the basis for determining the absolute phase position. This binary search process is particularly effective and fast in determining the absolute phase position.

In a preferred embodiment, at the beginning of the phase position determination, the two processes keep running until the rotor settles in a given phase position range, in particular, at a given phase position value; afterwards the coarse process only monitors breakouts of the motor. The coarse measurement process thus determines a constant offset value which, when added to the incremental rotor position information, supplies a certain phase angle. Based on this information, a current is generated and distributed across all the three phases, which allows the brushless electric motor to develop a suitable torque. As soon as a suitable approximation for the offset value has been found, this value is held constant by the coarse process until the fine measurement process has also finished. Then the offset value is corrected, using the value found during the fine measurement process. During the entire execution time of the fine process, the coarse process monitors only potential undesirable movements or break-outs of the motor, and intervenes only if these break-outs exceed a certain preset value or move outside a preset range.

Thus, when the determination of the phase position begins, both measurement processes are running simultaneously—or in parallel. As soon as the brushless electric motor is under control, the coarse measurement process terminates its main function and only monitors potential motor break-outs. From this point on, primarily the fine measurement process is operating, until it, too, terminates. All these actions provide a particularly effective, fast and safe method for determining the absolute phase position.

In the coarse process, the selected value for the desired movement of the rotor depends preferably on the measured break-out velocity or break-out acceleration of the rotor in the electric motor. If the coarse process which monitors the motor break-outs, determines that the rotor makes an undesired movement, then the actual phase position is corrected by an amount which is preferably proportional to the break-out velocity of the rotor, i.e. to the velocity with which the rotors is moving undesirably from a predetermined phase position range. The coarse process can preferably also correct the actual phase position by an amount which is proportional to the acceleration of the rotor or by a constant value, where the sign of the constant value depends on the break-out velocity. Particularly preferred is the application of possible combinations of the three corrective measures stated above.

After the rotor is again located within a given phase position range close to the starting position or after the rotor has assumed a given phase position value, the coarse measurement process holds the last approximate value of the phase position constant and again switches over to a passive monitoring function. The coarse measurement process has now completed its main task and returns again to its monitoring function, until the brushless electric motor again departs from the given range. Should this happens, then the coarse measurement process seeks a still better approximation for the absolute phase position, whereby the process corrects the previous value for the phase position by a certain value which may be, for instance, proportional to the break-out velocity. This process provides a particularly stable safety system which is able to control the brushless electric motor "in case of malfunctions" in a fast and safe manner. Consequently, the brushless electric motor is protected against both external forces and against internal problems arising during the determination of the phase position. If, for instance, during the time when the measurement process is running, the external load acting on the brushless electric motor changes, then the coarse measurement process intervenes and attempts to counteract the external load.

In another preferred embodiment, a current from the position and speed control is continuously supplied to the electric motor during the fine process. After each execution of the fine measurement process, the position and speed control is activated until the brushless electric motor has returned to its initial position and is stable.

During the fine process, the following steps are preferably repeated: first, a current vector is selected and added to a current vector given by the position and speed control; then the resulting current vector is applied to the electric motor; then the resulting phase position change of the rotor is measured; then this change forms the basis for the selection of another current vector and for the determination of the absolute phase position. Most preferably, the amplitude of the current vector is selected as the highest allowed amplitude of a driver circuit in the position and speed control. As a result, the brushless electric motor is able to withstand large loads when the measurement process for the phase position is executed.

In another preferred embodiment, only the fine measurement process is applied to an electric motor in which the rotor is permitted to rotate during the measurement process. This particular situation can occur, even if no static load is applied to the brushless electric motor, e.g. for axes which have to be moved horizontally. If the design or the requirements for accuracy permit a slight motion of the brushless electric motor during the measurement process, then the entire measurement process can be safely reduced to just using the fine measurement process; whereby, however, after each execution of the fine process, a pause has to be inserted, so that the rotor has sufficient time to come to a complete stop. During this process, the rotor will preferably not be steered back to its initial position, but the actual phase position of the rotor in relation to the stator will be used as new starting value for determining the phase position.

Preferably, parameters internal to the process or to the apparatus are optimized using a fuzzy controller). Hereby, parameters which form the basis for the measurement process and determine, e.g., the time required for the process to converge or the stability against external forces, can be, so to speak, internally optimized—i.e. by the process itself. This results in an extremely flexible and adaptable system. If a brushless electric motor is equipped with the aforementioned apparatus according to the invention, then this brushless electric motor can be employed in various applications, where the motor can, during the first trial runs, adapt to its new environment and, after the trial runs, compensate for variations caused by external forces during normal operation.

In another preferred embodiment, the position and speed control comprises a bipolar driver circuit. Furthermore, the evaluation means and/or the excitation means are preferably implemented by means of a programmable program unit. As a result, the entire apparatus according to the invention can easily fit into an small and compact circuit.

An apparatus according to one the present invention is preferably used to controllably start an electric motor. During the start-up in particular, no information about the absolute phase position is available. The position can, of course, be saved in a non-volatile memory before the unit is powered down; however, external factors can change the rotor position in such a way that the correlation is completely lost. As a result, the electronics would have to determine the exact absolute phase position on turn-on anew. Also, information about the rotor position can be lost during the normal operation of the brushless electric motor as a result of external factors, etc. In this situation, too, the process according to the invention can preferably be utilized.

Further advantages of the details of the invention are evident from the following description of preferred embodiments. In this description, reference will be made to the attached schematic drawing.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PRESENTLY PREFERRED EMBODIMENTS

Figure 1:
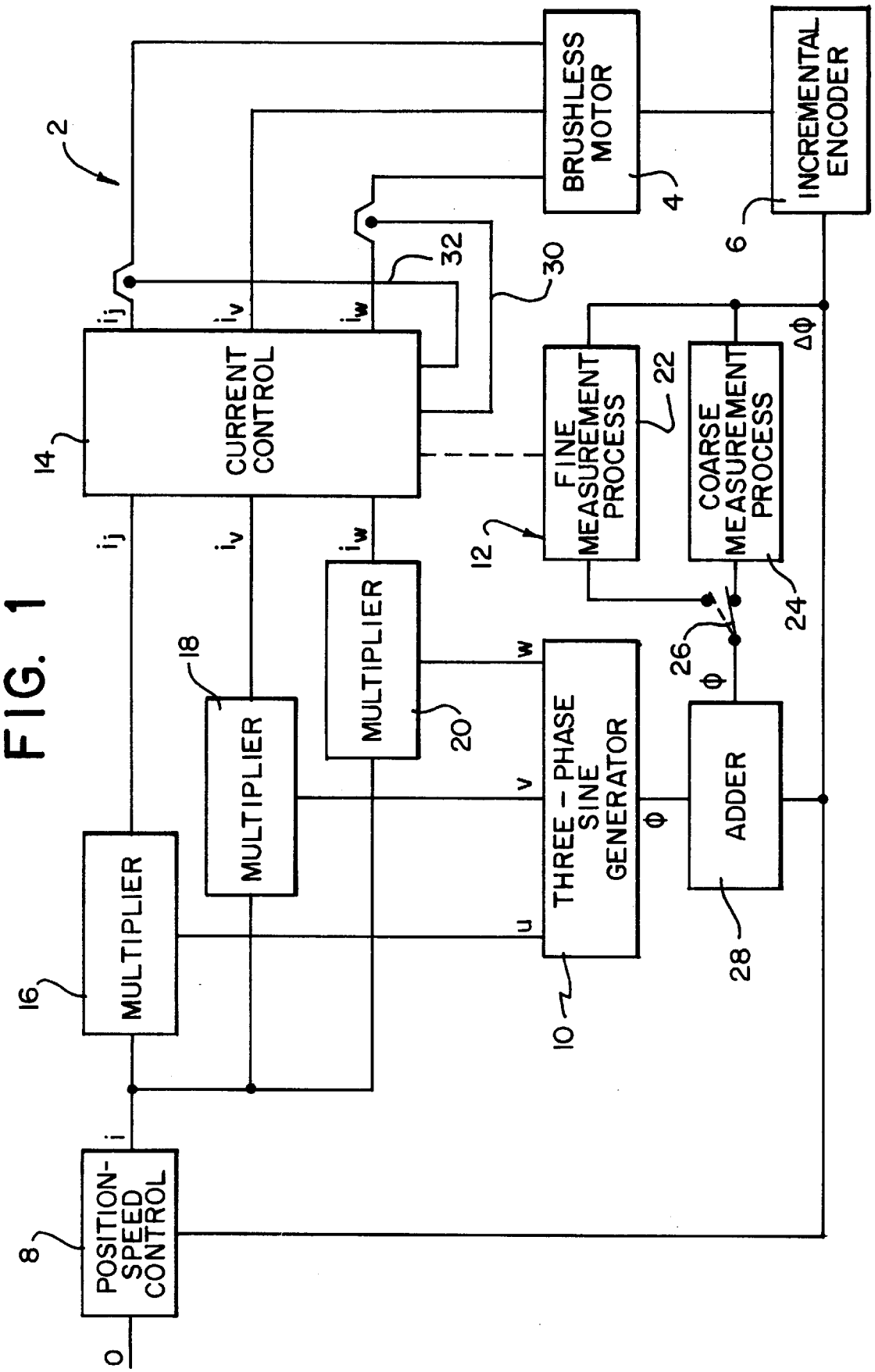
FIG. 1 A circuit diagram of a circuit with position and speed control for a brushless electric motor and an apparatus according to the invention for determining the absolute phase position.

FIG. 1 shows the schematic representation of a circuit diagram 2, comprising a brushless motor 6, an incremental encoder 6 as measuring system, a position and speed control 10, a three-phase sine generator 10, an apparatus 12 according to the invention for determining the absolute phase position of a rotor in relation to a stator in the brushless motor, and a current control.

The three separate outputs of the three-phase sine generator are each electrically connected by means of three separate connections to the input of each of multipliers and the output of each of the multipliers is electrically connected by means of three connections to one of three inputs of the current control. In the same manner, the three separate outputs of the position and speed control are electrically connected to the input of each of the multipliers and the three outputs of the current control 14 are each electrically connected by means of three separate connections to the three pole pairs of the brushless electric motor.

The three-phase sine generator provides three phase-shifted sine waves U, V, W which are shifted by 120°, to the corresponding three multipliers. The three corresponding sine waves U, V, W are determined as follows:

$$U(t)=\cos\ (\Phi(t)+\Phi_1) \qquad (1)$$

$$V(t)=\cos\ (\Phi(t)+\Phi_1+2\pi/3) \qquad (2)$$

$$W(t)=\cos\ (\Phi(t)+\Phi_1+4\pi/3) \qquad (3)$$

The term $\Phi(t)$ in the formulas (1), (2), and (3) describes the temporal change of the phase position of the rotor which can also be expressed as:

$$\Phi(t)=\alpha(t)*2p, \qquad (4)$$

wherein the angle $\alpha(t)$ specifies the change in the mechanical phase position over time and the number p specifies the number of pole pairs of the brushless electric motor. The term $\Phi_1$ in the formulas (1), (2), and (3) is the phase angle, which has to be determined and which in conjunction with the temporal change of the phase position $\Phi(t)$, specifies the actual absolute phase position at time t. The position and speed control provides a current i of a given amplitude and phase to each of the three multipliers. The current i is phase-shifted in the corresponding multiplier according to the phase position U, V, and W of the three-phase sine generator 10, which leads to the following three current phases $i_u$, $i_v$, and $i_w$:

$$i_u(t)=i\cos\ (\Phi(t)+\Phi_1) \qquad (5)$$

$$i_v(t)=i\cos\ (\Phi(t)+\Phi_1+2\pi/3) \qquad (6)$$

$$i_w(t)=i\cos\ (\Phi(t)+\Phi_1+4\pi/3) \qquad (7)$$

Considering a simplified brushless electric motor with exactly three pole pairs, where each of the pole pairs is supplied by the current phases $i_u$, $i_v$, and $i_w$, and assuming that the magnetic induction B in the air gap is sinusoidally distributed, then the magnetic field strength at each of the windings assigned to each of the three phases becomes:

$$B_u(t)=B\cos\ (\Phi(t)+\Phi_1) \qquad (8)$$

$$B_v(t)=B\cos\ (\Phi(t)+\Phi_1+2\pi/3) \qquad (9)$$

$$B_w(t)=B\cos\ (\Phi(t)+\Phi_1+4\pi/3) \qquad (10)$$

The total torque M to the rotor is the sum of the torques to the rotor which are generated by each phase on the corresponding winding:

$$M=M_u+M_v+M_w=k(B_u i_u+B_v i_v+B_w i_w) \qquad (11)$$

For simplification, the number of windings, the geometric factors, the number of pole pairs are all included in the constant k. The total torque is derived by inserting the equations (5)–(7) and (8)–(10):

$$M=2/3k\ B\ i\ \cos\ (\Phi(t)+\Phi_1) \qquad (12)$$

It is evident from equation (12) that the total torque M—e.g. upon turn-on ($\Phi(t)=0$)—assumes a favorable value only for a certain phase position $\Phi_1$. Under unfavorable conditions, the total torque can even be zero. This makes it clear why accurate information about the phase position of the rotor in relation to the stator is essential for accurately controlling the brushless electric motor 4.

In the embodiment shown in FIG. 1 the current control controls the current phases $i_u$, $i_v$, and $i_w$ supplied to the brushless electric motor. The inner loop 30 is a current control loop which is usually implemented in hardware. In this example, the inner loop controls the current phase $i_w$. The outer loop 32 is a position and speed control loop which is usually implemented in software. In this example, the outer loop controls the current phase $i_u$. In the brushless electric motor, the incremental encoder 6 monitors the rotation of the rotor and thus the phase position change of the rotor in relation to the stator. This information is sent—either directly or encoded—by the encoder to the apparatus 12 for determining the absolute phase position, to the position and speed control, and to the three-phase sine generator. For this purpose, the incremental encoder is connected to the apparatus for determining the absolute phase position and to the position and speed control; the encoder is connected to the three-phase sine generator via an adder. The adder primarily adds all the information supplied by the incremental encoder and by the apparatus 12 for determining the absolute phase position, and sends this information to the three-phase sine generator.

The apparatus for determining the absolute phase position 12 essentially comprises two apparatus which are designed to execute the following two processes: a fine measurement process and a coarse measurement process. Both processes receive their information from the incremental encoder. The position of switch which is provided merely as a guide, determines which of the two processes and is running, their operation further depending on certain conditions, which are discussed below in greater detail. At the beginning,—during the start-up phase—both processes and are running in parallel and independent of each other, attempting to determine the absolute phase position; after the start-up phase, however, the absolute phase position is exclusively determined by the fine measurement process, and the coarse measurement process only monitors undesired break-outs of the brushless electric motor and compensates for these break-outs.

When the circuit and hereby also the brushless electric motor are powered up, the rotor is positioned in an arbitrary phase position in relation to the stator. As shown in equation (12), the electric motor 4 can usually not be controlled by the classic position and speed control 8 alone, since the value $\Phi_1$ is unknown when the power is turned on. If a value for $\Phi_1$ is chosen arbitrarily, then it can happen that the electric motor generates only a small torque or no torque at all, or, under most unfavorable conditions, it can happen that the motor turns in the opposite direction rather than in the desired direction. The exclusive utilization of the known position and speed control 8, therefore, supplies only a relative value $\Phi(t)$ which has no relation to the actual starting value $\Phi_1$ and which continues to be monitored by the incremental encoder starting with the value zero at power-up.

According to the invention, the apparatus for the coarse measurement process provides an approximation for the constant phase position value $\Phi_1$. This value, when added by means of the adder 28 to the time dependent phase position $\Phi(t)$ of the incremental encoder, provides as a result an approximate absolute phase position of the rotor in relation to the stator. This information is supplied to the three-phase sine generator which in turn generates therefrom the three phases U, V, and W. These phases, in turn, generate the current phases $i_u$, $i_v$, and $i_w$ which allow the brushless motor to generate a suitable torque. As soon as a suitable approximation for $\Phi_1$ is found, this value is held constant until the apparatus for the fine measurement process completes its task and provides the phase position value $\Phi_1$ which, when added to the time dependent phase position $\Phi(t)$, specifies the actual absolute phase position of the rotor in relation to the stator. At this point, the apparatus for determining the absolute phase position has fulfilled its task, and all subsequent control functions are assumed—as before—by the position and speed control.

Figure 2:
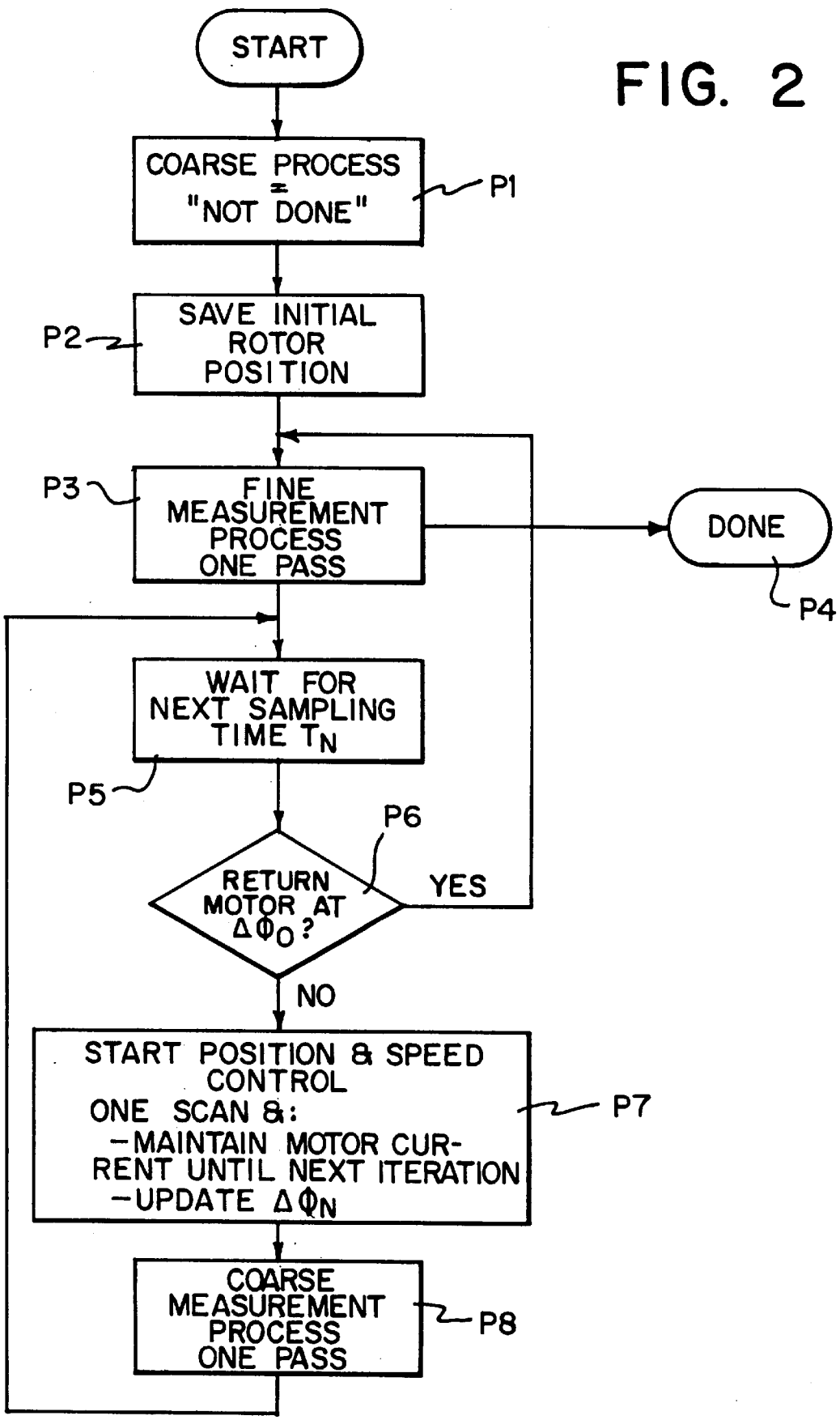
FIG. 2 A flow diagram with a schematic timing sequence of a control process according to the invention which controls the coarse and fine measurement processes.

FIG. 2 shows a schematic representation of a flow diagram for the control process which controls the fine and the coarse measurement processes and which is implemented in the apparatus for determining the absolute phase position. This controlling process 12 starts, for instance, after the power for the entire circuitry 2 has been turned on. In the first process step P1, the control process 12 sets the values for the phase position value $\Phi_1$, which is to be determined, and the maximum possible phase position change $\Delta\Phi_{max}$ to zero. In addition, the process sets a decision parameter which specifies if the coarse measurement process 24 has finished or not, to "not done." Finally, the process assigns certain values to two more numbers L and R which correspond to an additional phase position information—if the rotor rotates clockwise or counter-clockwise in relation to the stator. In this embodiment, L is set to zero and R is set to 511. Then the control process 12 proceeds to process step P2. In process step P2, the control process 12 reads the value $\Delta\Phi$ supplied by the incremental encoder. This value provides the change in the phase position of the rotor over time in relation to the start position—i.e. with respect of the position of the rotor, for instance, immediately after the power for the circuit 2 is turned on. Then, the control process 12 continues to process step P3.

In process step P3, the control process 12 calls the fine measurement process during one pass. This fine measurement process has the effect that a given current is applied to the brushless electric motor until a (minimum, dependent on the resolution of the incremental measuring system) phase position change occurs. The measured phase position change is taken into account in a subsequent calculation. If the fine measurement process is completed, i.e. the absolute phase position was found, the control process 12 branches to process step P4 and terminates there. If the fine measurement process 22 is not yet completed, then the control process 12 continues to process step P5.

In process step P5, the control process 12 waits for the next sampling time $T_N$, which is, for instance, supplied by an internal clock of circuit 2. Then the control process 12 continues to process step P6 where it checks if the position of the rotor in relation to the stator has the same value as, for instance, immediately after the power was turned on—or essentially, a value of zero for the phase position change $\Phi(t)$ with time. Since the control process 12 does not take measurements continuously, but obtains only discrete values for $\Phi(t)$—at the corresponding sampling times $T_N$—, the value for the discrete phase position change $\Delta\Phi_N$ with time is compared with the initial value $\Delta\Phi_0$. If the motor is in its initial position corresponding to $\Delta\Phi_0$, then the control process 12 branches back to process step P3. Otherwise, the control process continues to process step P6, where it calls the position and speed control 8 during one pass.

In process step P6, the control process 12 makes sure that the current i which is currently applied to the motor by the position and speed control, is maintained until the following completion of the process step P7. In addition, the process updates the discrete phase position change $\Delta\Phi_N$.

Then, the control process 12 continues to process step P8, where it calls the coarse measurement process during one pass. Subsequently, the process returns to process step P4.

Figure 3:
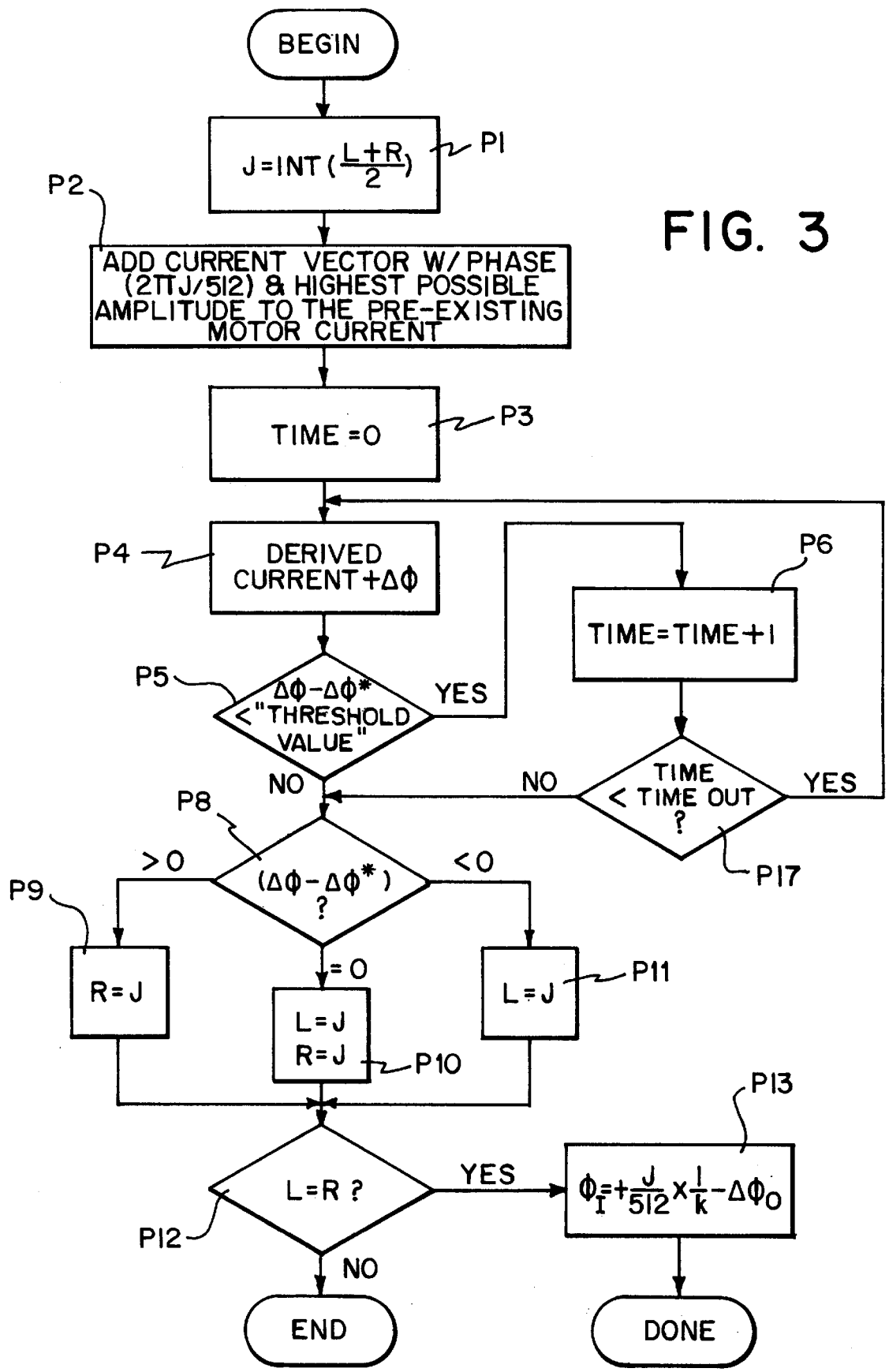
FIG. 3 A flow diagram with a schematic timing sequence of a coarse measurement process according to the invention.

FIG. 3 shows a schematic of a flow diagram for the fine measurement process. During the fine measurement process, the internal clock in circuit 2 which supplies the sampling times $T_N$, is switched off. In addition, during the fine measurement process, the current i which was calculated by the position and speed control, is applied to the brushless electric motor 4 until the next call, in order to ensure that the electric motor is able to hold possible static loads (z-axis). The fine measurement process now adds repeatedly current vectors with different phases and the largest possible amplitudes—meaning that the vector sum of the current i from the position and speed control and the current from the fine measurement process must not exceed the maximum allowed current limit of the driver circuit for the brushless motor 4—to the current i supplied by the position and speed control. Although this process takes very little time, the time must be set sufficiently long in order to allow the rotor a little movement. Subsequently, the fine measurement process monitors how far and in which direction the rotor has moved. After each iteration N, the information with respect to the direction of rotation is taken into account and the following search interval is bisected. This method provides the value for $\Phi_1$ with the desired accuracy after at most N iterations, where N is calculated from the initial values for L and R, respectively, according to the following formula:

$$N = \log_2 R \tag{13}$$

The fine measurement process starts with the process step P1 in which it assigns an integer number which is averaged from the two values L and R, to the variable J. The fine measurement process continues to process step P2, where it adds by way of the three-phase sine generator in conjunction with the three multipliers a current vector with the phase $2\pi J/512$ and a maximum allowed amplitude, to the current i which is maintained by the position and speed control. The fine measurement process continues to process step P3 where a variable "Time" is set to zero. This variable is a measure for the time during which the current vector ($i_u$, $i_v$, $i_w$) from process step P2 is applied to the electric motor 4.

The fine measurement process continues to process step P4 where the actual phase position change $\Delta\Phi$ at that point in time is read. Since the clock is switched off, the process does not read the discrete phase position changes $\Delta\Phi_N$ which correspond exactly to a specific time of the internal clock, but only the actual phase position changes $\Delta\Phi$ at times, which correspond to the "artificial" timing marks generated during the execution of process steps P4 through P7.

The fine measurement process continues to process step P5 where the difference between the measured current value for $\Delta\Phi$ and the previous value for the actual phase position change $\Delta\Phi^*$, which was determined in process step P4, is calculated and compared to a "threshold value." This "threshold" value can, for instance, correspond to several time markers—i.e. to a certain number of small incremental steps—of the incremental encoder. During this query, the fine process checks that the rotation of the rotor is neither too fast nor too strong to exceed a certain value—the "threshold value."

If the rotation of the rotor falls within a specified range, then the fine process branches to process step P6, where the time variable is incremented by one unit. From there, the process continues to process step P7, where the time variable is compared to a given value "Time out". This value "Time out" is the time period during which the fine process waits for a reaction of the rotor to the applied current. If the time period is still running, then the fine process returns to process step P4. If the given time limit, however, has been exceeded, then the fine process 22 branches to process step P8.

The fine process arrives at process step P8 even if it was found in process step P5 that the difference between the actual $\Delta\Phi$ and the previous temporal phase position change $\Delta\Phi^*$ is larger than the given "threshold value."

In process step P8, the fine process checks if the difference between the actual $\Delta\Phi$ and the previous temporal phase position change $\Delta\Phi^*$ is equal to zero, and if not, if the difference is negative or positive. This check determines if the relative phase position has changed from one point in time to the next, and if this did occur, in which direction. If the difference is equal to zero, then the fine process branches to process step P10, where the value J is assigned to both variables L and R, since the rotor did not rotate any further and the phase position value $\Phi_1$ has thus been found.

If the difference is negative, then the fine process branches to process step P11, where the value J is assigned to the variable L, since the rotor rotated counterclockwise. From the process steps P9–P11, the fine process continues to process step P12 where it checks if the variable L has the same value as the variable R. If this is true, then the exact phase position value $\Phi_1$ was found (see P10). In this case, the fine process branches to process step P13, where it calculates the absolute phase position $\Phi_1$ according to the following formula:

$$\Phi_1 = J/512 \times 1/k - \Delta\Phi^* \tag{14}$$

Herein, k is the geometric factor from equation (11). If the values for R and L are not the same, then the rotor did rotate. This ends, however, the actual pass of the fine measurement process for the moment, and the fine process returns to the controlling control process.

In special situations where no static load is applied to the electric motor—for instance, if only horizontal axes have to be moved and if a slightly larger movement of the motor can be tolerated during the process 12 for determining the absolute phase position, it is basically possible to limit the entire measurement process 12 to only calling the fine measurement process. In this case, after each excited movement of the electric motor 4, a pause is introduced until the electric motor 4 has come to a complete stop. Subsequently, the measured actual phase position change $\Delta\Phi$ at that time will form the basis for determining the actual phase position during the next pass.

All allocations or queries listed in the individual process steps refer to an incremental encoder which is wired in such a way that it supplies a current according to the equations (5)–(7) to the brushless electric motor, whereby $\Phi(t)$ increases monotonously, if the measured movement or rotation is positive, i.e. clockwise. Otherwise, the sign of all values in the flow diagrams which are marked with an asterisk (*), has to be changed. In addition, the expression (14) for $\Phi_1$ is changed to:

$$\Phi_1 = -J/512 \times 1/k - \Delta\Phi^* \tag{14a}$$

In addition, the information $\Phi$ of the circuit 2 of FIG. 1, has to change sign before it is fead to the three-phase sine generator.

Figure 4:
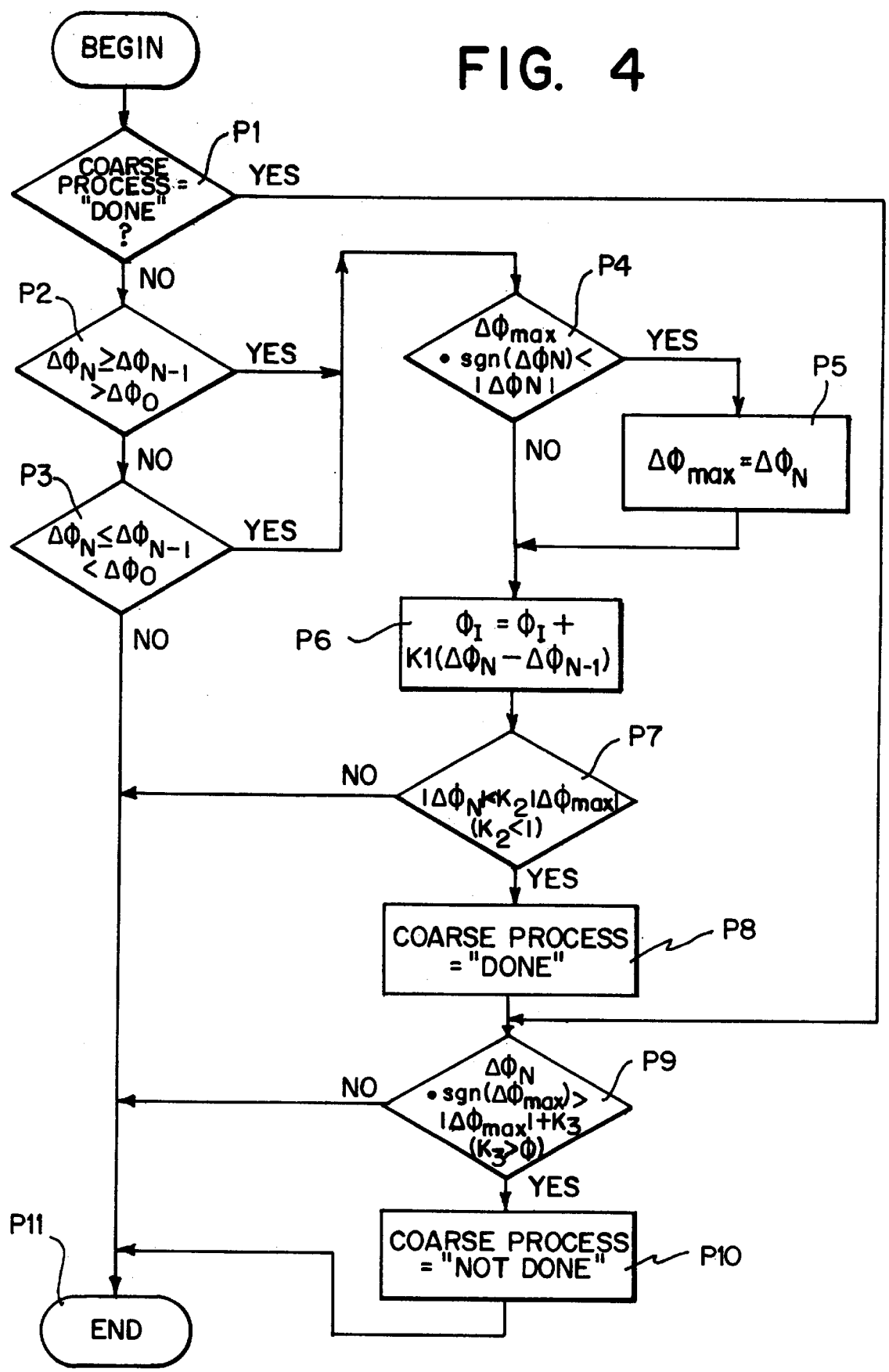
FIG. 4 A flow diagram with a schematic timing sequence of a fine measurement process according to the invention.

FIG. 4 shows a schematic representation of a flow diagram for the coarse measurement process. The coarse measurement process monitors, among others, the brushless electric motor in order to prevent uncontrolled movements by the motor. If such movements should occur, $\Phi_1$ is modified by a certain value which is, with a factor $k_1$, proportional to the break-out velocity of the rotor. Herein, the break-out velocity is a measure for the angular velocity of rotation of the rotor. As soon as the brushless electric motor is within a certain range close to its initial position, where the boundaries of this range are determined by $k_1$, the coarse process maintains the actually determined value for $\Phi_1$ and switches a decision parameter "coarse measurement process" to "done." This means that the coarse measurement process is terminated and performs from here on only a safety monitoring role. The process is only called again to obtain a more accurate estimate of the phase angle $\Phi_1$, if the brushless electric motor 4 breaks out again.

The "threshold value" which determines when the rotor has broken out, is given by a factor $k_3$. It has to be pointed out that the coarse measurement process can only converge toward a solution when the electric motor is moved—e.g. by way of a "disturbance." This "disturbance" is mainly generated by the fine measurement process.

The coarse measurement process starts at the process step P1, where it queries the decision parameter "coarse process." If it finds that the decision parameter is in the "done" state, then the coarse process branches to process step P9. Otherwise, it continues to process step P2.

In process step P2, the current discrete phase position change $\Delta\Phi_N$ is compared to the discrete phase position change $\Delta\Phi_{N-1}$ during the previous pass. If the current value is larger than the previous value, then the coarse process branches to process step P4. Otherwise, it continues to process step P3 where it queries in the same manner as in process step P2.

If it is determined in process step P3 that the current value is smaller than the previous value, then the coarse process branches to process step P4. Otherwise—i.e. when the current value is equal to the previous value—the coarse measurement process is terminated.

In process step P4, the highest value $\Delta\Phi_{max}$ for the discrete phase position change which has occurred over time, is multiplied by the sign of the actual phase change and the result is compared to the value of the current discrete phase position change $\Delta\Phi_N$. If the first value is smaller than the second value, then the coarse process branches to process step P5 where the value for $\Delta\Phi_{max}$ is set to the value for the current discrete phase position change $\Delta\Phi_N$. This process always provides an updated value for the highest discrete phase position change $\Delta\Phi_{max}$ observed over time. Otherwise, the coarse process continues to process step P6.

In process step P6, the coarse process changes the value for the absolute phase position according to the following formula:

$$\Phi_1 = \Phi_1 + k_1(\Delta\Phi_N - \Delta\Phi_{N-1}) \quad (15).$$

Subsequently, the coarse process continues to process step P7, where the value for the current discrete phase position change $\Delta\Phi_N$ is compared to the product of the factor $k_2$ and the highest value $\Delta\Phi_{max}$ for the discrete phase position change which has occurred over time. If the first value is larger than the second value, then the coarse process continues to process step P8. Otherwise, the coarse measurement process is terminated.

In process step P8, the decision parameter "coarse process" is set to "done." From there, the coarse process continues to process step P9, where another query is conducted. The product between the current discrete phase position change $\Delta\Phi_N$ and the sign of highest value $\Delta\Phi_{max}$ for the discrete phase position change which has occurred over time, is computed and compared to the sum of the absolute value of $\Delta\Phi_{max}$ and a constant $k_3$. If the product is larger than the sum, then the coarse process continues to process step P10. Otherwise, the coarse measurement process is terminated.

In process step P10, the decision parameter "coarse process" is set to "Not done." Subsequently, the coarse measurement process is terminated.

The reaction of the position and speed control to phase position changes during the determination 12 of the absolute phase position has to be dampened as compared to the reaction of the position and speed control during normal operation of the brushless electric motor—i.e. without running the additional process 12 for determining the absolute phase position. There exist essentially two reasons for this:

First, the coarse measurement process is very susceptive to sudden or strong movements and overdriving of the brushless electric motor which could result in a poor approximation for the phase position value $\Phi_1$.

Second, during the first passes of the coarse measurement process, the approximation is not yet very accurate. Since the position and speed control 8, however, utilizes this value of $\Phi_1$ the brushless electric motor could move in a direction other than the desired direction and get out of control. The coarse measurement process requires some time before it finds a reasonable approximation for $\Phi_1$ and gains control over the brushless electric motor. In order to minimize undesired motor movement during this time, the position and speed control 8 must not react too strongly.

During normal operation and also during the measurement process 12, the position and speed control is applied in the same manner as during normal operation of the motor. The current i supplied by the position and speed control is determined preferably according to a classic digital PID device. The current $i_N$ during the N-th iteration is calculated from the following differential equation:

$$i_N = c_1(c_0(x_{N(ref)} - X_{N(mot)}) + v_{N(ref)} - v_{N(mot)}) + c_2/c_1 c_0(i_{N-1}) - \quad (16)$$

$$c_2/c_0(v_{N-1(ref)} - v_{N-1(mot)}),$$

where:

| | |
|---|---|
| $V_{N0}$ | $:= x_{N0} - x_{N-10}$, |
| $x_{N(ref)}, v_{N(ref)}$ | $:=$ reference position, reference velocity |
| $x_{N(mot)}, v_{N(mot)}$ | $:=$ motor position, velocity feedback, |
| $c_1, c_2, c_3$ | $:=$ coefficients |

This additional procedure is employed for sensing and correcting a possible "slippage" in the rotor position. This is particularly important for synchronized movement along multiple axes. Although it is not explicitly expressed in equation (16), the integral portion is only affected by an error in the position.

Therefore, in order to increase the damping of the position and speed control 8 during the start-up phase of the coarse measurement process, the amplifier for the position error has to be weighted less (e.g. by a factor of 50 as compared to the value during normal operation) than the amplifier for the velocity error (this corresponds to the factor $c_0$), whereas the factors $c_1$ and $c_2$ remain almost unaffected. The reaction per test step thus becomes slower. In addition, position errors are almost exclusively corrected by the integrator $c_2$ and thus depend on the intrinsic time 24 constant.

The set of coefficients $k_1$, $k_2$, and $k_3$ in the coarse measurement process also has to be selected very carefully.

The coefficient $k_1$ determines the "target" of the coarse process, i.e. from which point on the approximation for $\Phi_1$ can be regarded as sufficiently accurate. It follows that the coarse process converges faster and therefore finishes faster, when the value for $k_1$ is larger. An increase of $k_1$, however, can at the same time lead to instabilities during execution of the entire measuring process 12.

In the coarse process, the coefficient $k_2$ specifies the point in time when the process should stop searching for a better approximation for $\Phi_1$. If a value close to 1 is selected for $k_2$, then the coarse process finishes too quickly and gives a value for $\Phi_1$ which is too inaccurate. On the other hand, if the value for $k_2$ is too close to zero, instabilities can occur. Finally, the value for $k_3$ determines the threshold value which, when exceeded, calls once again the coarse process in order to find a better approximation for $\Phi_1$, although the process was previously terminated. The threshold value should not be selected too narrow in order to provide a certain flexibility to the electro-mechanical system.

It is evident that the coefficients are not independent of each other and that the system has to be optimized and tuned has in several tries or steps. However, the selection of the coefficients is not as critical as it may appear. Therefore, a certain selection, for instance, for $k_1$, $k_2$, and $k_3$ can work satisfactorily for numerous applications (different loads, friction, etc.). It is advantageous to select the coefficients $c_1$, $c_2$, and $c_3$ first for a brushless electric motor with a known rotor position or for a brushless electric motor which can be brought into a known absolute rotor position.

The various coefficients can also be selected by a fuzzy controller.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A method for controlling a brushless electric motor by determining an absolute angular position of a rotor in geometric relation to a stator of the electric motor, comprising the following steps:
    (a) exciting a movement of the rotor by applying a predetermined signal being one of trapezoidal and sinusoidal to the motor, wherein the step (a) of exciting includes the step of:
        (a1) generating the predetermined signal from a constant rotor angular position value approximated by a coarse measurement process, and from a time dependent rotor angular position value from an incremental encoder;
    (b) measuring the value of the respective relative geometrical and physical position change of the rotor in relation to the stator using the incremental encoder;
    (c) deriving the absolute position from the value of the relative position change and the applied signal using the coarse measurement process and a fine measurement process; and
    (d) repeating steps a) to c) by adapting the value of the predetermined signal for obtaining a more precise value for the absolute position of the rotor in relation to the stator than obtained in step (c).

2. The method according to claim 1, wherein the step of exciting the at least one movement of the rotor is provided by a position and speed control unit which responds to the predetermined signal derived from the values from the coarse measurement process and the incremental encoder.

3. The method according to claim 1, wherein the electric motor is excited by a sinusoidal current mode.

4. The method according to claim 1, wherein the electric motor is excited by a trapezoidal current mode.

5. The method according to claim 1, further comprising the step of measuring the phase position change ($\Delta\Phi_N$) with an incremental, optical measuring system.

6. The method according to claim 1, further comprising the step of determining the absolute phase position via a fine measurement process and a coarse measurement process, whereby retaining the rotor in the coarse measurement process in a specified phase position range, at a given value; and determining the exact absolute phase position in the fine measurement process.

7. The method according to claim 6, wherein in the fine measurement process, the absolute phase position is determined by a binary search routine.

8. The method according to claim 7, wherein, at the beginning of determining the angular position of the rotor, the coarse measurement process and the fine measurement process run until the rotor assumes a specified angular position range of the rotor, and subsequently during the coarse process, only motor break-outs are monitored.

9. The method according to claim 7, further providing the step in the coarse process of selecting the magnitude of the rotor movement to be excited depending on the measured break-out velocity or break-out acceleration of the rotor in the electric motor.

10. The method according to claim 9, further comprising the step of supplying during the fine process, a current (i) to the electric motor by position and speed control.

11. The method according to claim 10, further comprising the step in the fine process of repeatedly:
    a) selecting a current vector initially and adding to a current vector (i) which is set by the position and speed control (8),
    b) applying the resulting current vector (($i_u$, $i_v$, $i_w$)) to the electric motor (4),
    c) measuring the phase position change ($\Delta\Phi_N$) of the rotor so generated; and
    d) using the phase position change as a basis for selecting another current vector as well as for determining the absolute phase position.

12. The method according to claim 11, further comprising the step of selecting the amplitude of the current vector (($i_u$, $i_v$, $i_w$)) as the maximum allowed amplitude of a driver circuit of the position and speed control.

13. The method according to claim 12, further comprising the step of applying only the fine measurement process for an electric motor for which rotor rotations are allowed during the measurement process.

14. The method according to claim 13, wherein the rotor is not returned to its initial phase position ($\Delta\Phi_0$), but the current phase position ($\Delta\Phi_N$) is selected as a new starting value for determining the absolute phase position.

15. The method according to claim 12, further comprising the step of optimizing the parameters internal to the process by a fuzzy controller.

16. An apparatus for controlling a brushless electric motor, comprising:
    a) exciting means for a movement of the rotor in the physical and geometrical relation to the stator by applying a predetermined signal to the motor, wherein the exciting means generates the predetermined signal from a constant rotor angular position value approximated by a course measurement process, and from a time dependent rotor angular position value from an incremental encoder;
    b) measuring means, include the increment encoder, for measuring the value of the respective relative physical and geometrical position change of the rotor in relation to the stator;
    c) interpreting means, including the course measurement process and a fine measurement process, for deriving the absolute position of the rotor in relation to the stator form value of the relative position change and the applied signal; and (d) control means for controlling the exciting means, the measuring means and the interpreting means in to obtain a more precise value for the absolute position of the rotor in the rotor by adapting the value of the predetermined signal.

17. The apparatus according to claim 16, wherein the measuring means is an incremental, optical measuring system.

18. The apparatus according to claim 17, wherein the exciting means includes a position and speed control unit which responds to the predetermined signal derived from the coarse measurement process and the incremental encoder.

19. The apparatus according to claim 18, wherein the position and speed control comprises a bipolar driver circuit.

20. The apparatus according to claim 19, wherein the interpreting means and the exciting means are implemented in a programmable program unit.

21. The apparatus according to claim 20, farther comprising a fuzzy controller for optimizing the parameters internal to the apparatus.

22. A method for controlling a brushless electric motor by determining an absolute angular position of a rotor in geometric relation to a stator of the electric motor, comprising the following steps:

(a) initializing an electrical current sum;

(b) exciting a movement of the rotor by applying a predetermined signal being one of trapezoidal and sinusoidal to the motor;

(c) measuring the value of the respective relative geometrical and physical position change of the rotor in relation to the stator;

(d) generating an electrical current corresponding to the measured position value;

(e) successively adding the electrical current to the electrical current sum;

(f) deriving the absolute position from the electrical current sum; and (g) repeating steps (b) to (f) by adapting the value of the predetermined signal for obtaining a more precise value for the absolute position of the rotor in relation to the stator than obtained in step (f).

23. The method of claim 22 wherein the electrical current is a vector, and the electrical current sum is a vector sum.

24. The method of claim 23 wherein the vector of the electrical current i has associated sinusoidal components $i_u$, $i_v$, $i_w$ being current phases such that:

$i_u$=i U, $i_v$=i V, $i_w$=i W, wherein U, V, and W are sinusoidal phase positions of a three-phase sine generator.

* * * * *

UNITED STATES PATENT AND TRADEMARK OFFICE
CERTIFICATE OF CORRECTION

PATENT NO. : 5,874,821
DATED : February 23, 1999
INVENTOR(S) : Riccardo MONELEON It is certified that error appears in the above-identified patent and that said Letters Patent is hereby corrected as shown below:

Title page, [73] Assignee, please add
--Agie, SA, losone, Switzerland--.

Signed and Sealed this

Twelfth Day of October, 1999

Q. TODD DICKINSON

Attest:

Attesting Officer

Acting Commissioner of Patents and Trademarks

UNITED STATES PATENT AND TRADEMARK OFFICE
CERTIFICATE OF CORRECTION

PATENT NO. : 5,874,821

DATED : February 23, 1999

INVENTOR(S) : Riccardo Monleone

It is certified that error appears in the above-identified patent and that said Letters Patent is hereby corrected as shown below:

Title page, [73] Assignee, please add
--Agie, SA, Losone, Switzerland--.

This Certificate supercedes certificate of correction issued October 12, 1999.

Signed and Sealed this

Nineteenth Day of September, 2000

Attest:

Q. TODD DICKINSON

Attesting Officer     Director of Patents and Trademarks